No. 896,078. PATENTED AUG. 18, 1908.
C. BLANKENHEIM.
BICYCLE SPRING FRAME.
APPLICATION FILED JAN. 9, 1908.
2 SHEETS—SHEET 2.
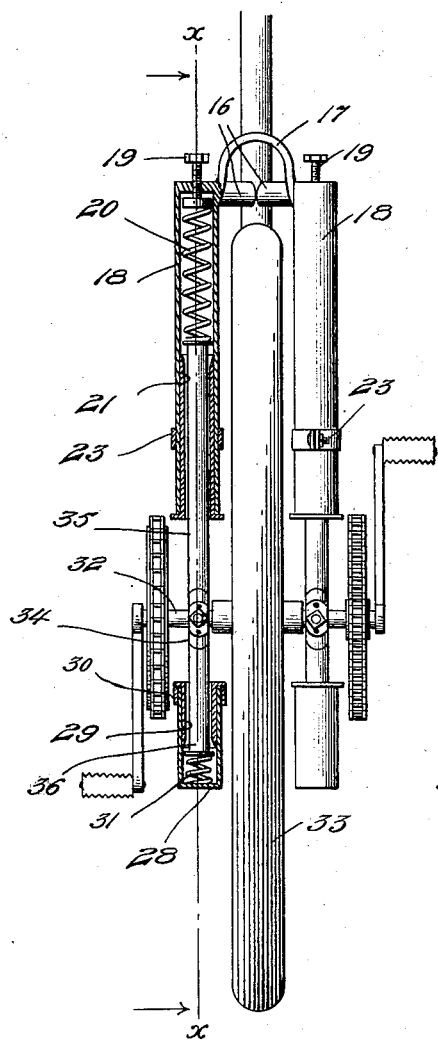
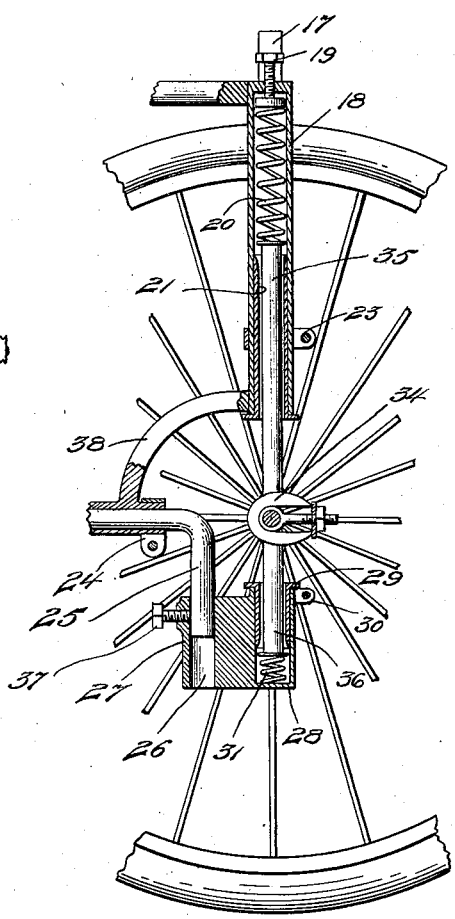
Witnesses
Inventor
Charles Blankenheim,
By
Attorneys

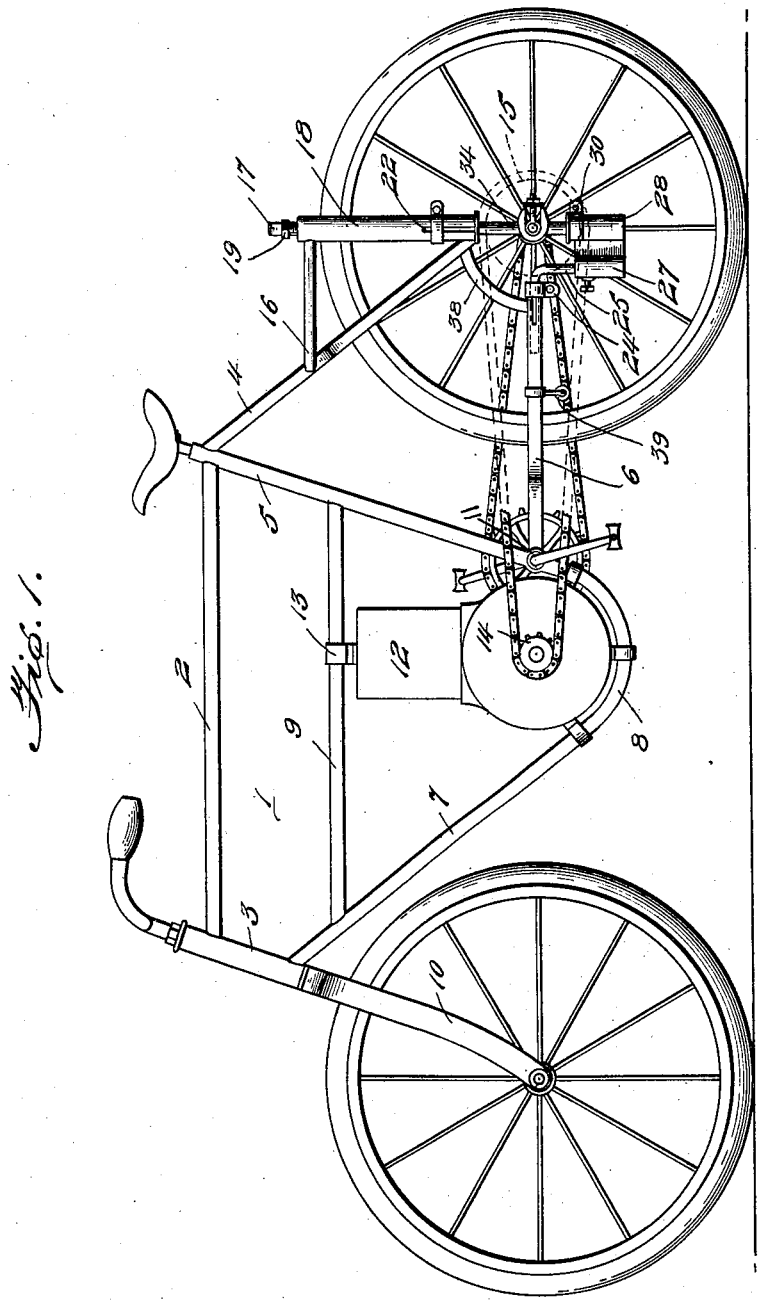

UNITED STATES PATENT OFFICE.

CHARLES BLANKENHEIM, OF CHICAGO, ILLINOIS.

BICYCLE SPRING-FRAME.

No. 896,078.  Specification of Letters Patent.  Patented Aug. 18, 1908.

Application filed January 9, 1908. Serial No. 409,985.

*To all whom it may concern:*

Be it known that I, CHARLES BLANKENHEIM, a citizen of the United States, residing at Chicago, in the county of Cook and State of Illinois, have invented certain new and useful Improvements in Bicycle Spring-Frames; and I do declare the following to be a full, clear, and exact description of the invention, such as will enable others skilled in the art to which it appertains to make and use the same.

This invention relates to velocipedes and especially to that type of vehicles known in the art as motor bicycles. While the device is especially adaptable for this class of vehicles, it may be utilized with other types and I wish it so understood.

Heretofore in devices of this character, the rider of the machine has been protected by being seated upon a spring seat or the rear fork braces are connected together by a spring tube and the front forks are resiliently connected with the fork head and the frame. As before stated this protects the rider but does not protect the motor and as a consequence the machinery is severely treated and wears out very rapidly.

It is the object of my invention to obviate these difficulties and to provide a machine of this character which may be had at a reasonable cost and which will have sufficient strength to withstand the strain to which such a device is subjected.

In the drawings,—Figure 1 represents a side elevation of the machine; Fig. 2 is a rear end elevation, and Fig. 3 is a vertical section, taken on line $x$—$x$ of Fig. 2.

Referring more especially to the drawings, 1, represents a bicycle frame which is composed of the upper horizontal tube 2, the head 3, the rear fork stays 4, saddle post tube 5, the rear forks 6, and the diagonal tube 7 from the head to the rear forks. The diagonal tube and the saddle post tube 5 are in this instance integral, and are connected by a U, 8. Parallel with the horizontal tube 2 and connecting the tubes 5 and 7 is a motor supporting tube and brace rack 9. All these parts, together with the spring fork 10 are common and need no further description, as is also the crank hanger 11. A suitable motor 12 is also carried by the frame in the U formed by the parts 5, 7 and 8 and is clamped to the bracing bar 9 by a clamping device 13. The motor is also provided with a suitable sprocket 14 which is connected with the rear wheel sprocket 15, as is usual.

Extended outwardly from the rear fork stays 4 are a pair of diverging arms 16, which are connected at their outer ends by an arched truss member 17 and depending from either end of this truss member are tubes 18 which are connected at their lower ends to the lower end of the fork stays 4. These tubes are provided in the upper ends with adjusting screws 19 which bear upon the springs 20 in the tubes 18 each of which is provided with a bushing 21, slotted in its side face as at 22 to correspond with the slot in the tube 18. A clamping member 23 is secured around the lower end of the tube so that it may work in conjunction with the slotted tube to compensate for any wear thereon.

The rear forks 6 are open at their ends and are also slotted as are the tubes 18 to allow a clamping member 24 to secure an L-shaped post 25 which has its L-end depending into a socket 26 formed in the cup member 27.
This cup member has a projecting tube 28 provided with a bushing 29, both of which are slotted and provided with a clamping member 30 to compensate for any wear thereon. A spring 31 is secured in the bottom of the tube 28 and acts in the capacity of a cushion for any upward movement or jolt on the frame. Clamped to the axle 32 of the rear wheel 33 is a supporting member 34 having its ends 35 and 36 reciprocally mounted in the tubes 18 and 28 respectively. The ends of this supporting member bear against the springs 20 and 31 and tend to hold the wheel in the position shown in Fig. 1. As the cup member 27 has no adjusting screw for regulating the tension of the spring I provide a set screw 37 which permits of the adjustment of the cup member upon the L-post 25. In this manner I am enabled to obtain the required tension on both springs and thus take up any shock which is received.

At the center of the supporting member 34, I provide an elongated slot in which the axle 32 is seated and surround the axle with the eye of a screw bolt, so that I may adjust the chain from the motor or from the crank sprocket. While the connection of the axle 32 with the supporting member 34 is sufficient to keep it in proper position within the tubes, I may make these tubes square and square the ends of the supporting members so that any turning will be impossible. A suitable connecting tube 38 is bridged between the ends of the rear forks and the rear fork stays to properly brace the parts and an idler roller 39 is provided to keep the tension taut in all positions of the wheel.

Having thus described my invention, what I claim is,—

1. In a self propelled vehicle, the combination with a driving wheel, of a frame secured thereto, and comprising in part rear forks and fork stays, of a tube connected to each fork stay on either side of the driving wheel, a brace connection from the fork stays to the tubes, a resilient connection between the driving wheel and the tubes, and a bridge piece connecting the tubes.

2. In a self propelled vehicle, the combination with a driving wheel, of a frame secured thereto, a motor, a connection between the motor and the driving wheel, a pair of tubes carried by the frame, one on either side of the wheel, a resilient connection between the driving wheel and the tube, an auxiliary pair of tubes, a resilient connection between the driving wheel and said auxiliary pair of tubes and means for adjustably supporting said auxiliary pair of tubes.

In testimony whereof I have hereunto set my hand in presence of two subscribing witnesses.

CHARLES BLANKENHEIM.

Witnesses:
NICHOLAS J. SCHMITZ,
ADAM HIPPCHEN.